US005698476A

United States Patent [19]

Johnson et al.

[11] Patent Number: 5,698,476

[45] Date of Patent: Dec. 16, 1997

[54] LAUNDRY ARTICLE FOR PREVENTING DYE CARRY-OVER AND INDICATOR THEREFOR

[75] Inventors: Kaj A. Johnson, Livermore; Gregory Van Buskirk, Danville, both of Calif.; Samuel M. Gillette, Whitsett, N.C.

[73] Assignee: The Clorox Company, Oakland, Calif.

[21] Appl. No.: 396,853

[22] Filed: Mar. 1, 1995

[51] Int. Cl.$^6$ .......... B32B 7/00

[52] U.S. Cl. .......... 442/121; 442/130; 442/164; 442/170; 442/171

[58] Field of Search .......... 428/279, 265; 442/121, 130, 164, 170, 171

[56] References Cited

U.S. PATENT DOCUMENTS

| | | | |
|---|---|---|---|
| 4,006,092 | 2/1977 | Jones | 252/95 |
| 4,052,159 | 10/1977 | Fuerst et al. | 8/169 |
| 4,087,247 | 5/1978 | Petzold et al. | 8/169 |
| 4,090,845 | 5/1978 | Petzold et al. | 8/169 |
| 4,106,903 | 8/1978 | Langheinrich et al. | 8/196 |
| 4,113,430 | 9/1978 | Otto et al. | 8/115 |
| 4,146,496 | 3/1979 | Gray et al. | 252/99 |
| 4,149,849 | 4/1979 | Koch et al. | 8/31 |
| 4,167,393 | 9/1979 | de Roo | 8/7 |
| 4,239,659 | 12/1980 | Murphy | 252/529 |
| 4,261,869 | 4/1981 | Bishop et al. | 252/542 |
| 4,331,441 | 5/1982 | Dvorsky et al. | 8/542 |
| 4,338,210 | 7/1982 | Clements et al. | 252/90 |
| 4,362,874 | 12/1982 | Kalk et al. | 544/317 |
| 4,369,041 | 1/1983 | Dvorsky et al. | 8/532 |
| 4,380,453 | 4/1983 | Claiborne | 8/606 |
| 4,389,214 | 6/1983 | Schaefer et al. | 8/527 |
| 4,397,777 | 8/1983 | Yurko | 252/563 |
| 4,441,884 | 4/1984 | Baumann et al. | 8/542 |
| 4,468,228 | 8/1984 | Dvorsky et al. | 8/188 |
| 4,475,920 | 10/1984 | Baumann | 8/542 |
| 4,494,264 | 1/1985 | Wattiez et al. | 8/150 |
| 4,615,709 | 10/1986 | Nakao | 8/599 |
| 4,629,468 | 12/1986 | Engelhard et al. | 8/442 |
| 4,634,544 | 1/1987 | Weber et al. | 252/99 |
| 4,737,156 | 4/1988 | Tambor et al. | 8/490 |
| 4,756,849 | 7/1988 | Weber et al. | 252/542 |
| 4,761,249 | 8/1988 | Giede et al. | 252/528 |
| 5,006,125 | 4/1991 | Patton et al. | 8/188 |
| 5,006,126 | 4/1991 | Olson et al. | 8/401 |
| 5,131,913 | 7/1992 | Martini | 8/448 |
| 5,147,411 | 9/1992 | Topfl | 8/606 |
| 5,149,456 | 9/1992 | Concannon et al. | 252/174.25 |
| 5,221,288 | 6/1993 | Kamata et al. | 8/554 |
| 5,242,463 | 9/1993 | Blanchard et al. | 8/196 |
| 5,252,103 | 10/1993 | Kamata et al. | 8/554 |
| 5,273,896 | 12/1993 | Pedersen et al. | 435/192 |
| 5,320,646 | 6/1994 | Patton et al. | 8/188 |
| 5,344,620 | 9/1994 | Reiners et al. | 427/288 |

FOREIGN PATENT DOCUMENTS

| | | | |
|---|---|---|---|
| WO 91 05 839 | 5/1994 | WIPO | C11D 3/37 |

*Primary Examiner*—Helen Lee
*Attorney, Agent, or Firm*—Sharon R. Kantor

[57] ABSTRACT

A system for removing extraneous, random free-flowing dyes from laundry washing applications which comprises a novel unitary dosing laundry article that can freely circulate among items being laundered. The laundry article further comprises a dye absorber and a dye transfer inhibitor which are introduced into a wash liquor via a support matrix. The dye absorber maintains a relational association with the support matrix in the wash liquor, whereas the dye transfer inhibitor is delivered up from the support matrix to the wash liquor and may be evenly distributed throughout the wash liquor. The laundry article of the present invention provides a method for preventing the redeposition of extraneous dyes onto other wash items, while simultaneously providing an indicator system for the manifestation of such scavenging process.

25 Claims, No Drawings

LAUNDRY ARTICLE FOR PREVENTING DYE CARRY-OVER AND INDICATOR THEREFOR

BACKGROUND OF THE INVENTION

1. Field of the Invention

The present invention relates to a system for removing extraneous random, free flowing dyes from laundry washing applications which contain wash items for which association of such random dyes is undesirable. More particularly, this invention is concerned with the scavenging of extraneous random dyes from laundry wash liquors, while concurrently providing an indicator system for the manifestation of such scavenging process.

2. Description of the Pertinent Art

When one or more items are laundered, the problem situation is often encountered where dyestuffs or colorants are given up from the items being washed to the wash liquor. Although the colorfastness and the number of times and conditions under which an item has been laundered are factors which can influence the amount of dyestuff given up, some amount of dye invariably becomes disassociated from its original fabric or substrate. Such extraneous dyes, which may also be referred to as "fugitive dyes," or "stray dyes," can become deposited upon or associated with other articles present in the same wash liquor. This dye carry-over phenomenon, commonly referred to as "dye transfer" causes undesirable discoloration and therefore results in an unsatisfactory appearance for articles being laundered. The result can be potentially deleterious in terms of the perceived overall efficacy of the laundry detergent which was used, and is therefore highly undesirable from a detergent performance standpoint.

One method for dealing with undesired dye transfer in wash applications has been to seek improvements to the affinity of the dye for the original fabric substrate to which it is applied. Towards this end, approaches have involved the slow heating of dye liquors, pre-treatment of textile fibers to improve dye affinity, after-treatment of dyed textiles and enhancements to the colorfastness of the dye or dyes used.

More recently, alternate techniques for dealing with extraneous dyes in wash liquors have involved the use of specific quaternized dye scavengers that are supported on cellulosic substrates (U.S. Pat. No. 4,380,453). Yet another approach taken to address this problem features a "filtering envelope approach" (U.S. Pat. No. 4,494,264) to physically separate dye-generating materials from the remaining laundry items. In practice, however, it has been determined that the former dye-scavenging approach requires an impractical size for the dosing device to reduce bleeding to manageable or even acceptable levels, and is restrictive in terms of possible substrate candidates that are compatible with the dye scavengers taught and claimed. The latter approach suffers from the physical inconvenience of having to sort items into a confining laundry envelope, can result in decreased cleaning due to restricted movement of the enveloped items through the wash liquor, and provides no mechanism for hindering dye carry-over among items in the envelope.

Other approaches to address the problem of extraneous dyes in laundry wash liquors have involved the use of dye transfer inhibitors added directly to a wash liquor either as a laundry aid or as an auxiliary component of the laundry detergent itself. Numerous substances have been studied as dye transfer inhibitors. Some of these include polyvinyl pyrrolidone (PVP) (U.S. Pat. No. 4,006,092), polyvinyl alcohol (PVA) (Canadian Pat. No. 2,104,728), polyvinyl imidazole (PVI) (DE 3,840,056), polyamine-N-oxides (EP 579,295), cationic starches (U.S. Pat. No. 4,756,849; EP 044003), minerals such as magnesium aluminate and hydrotalcite (U.S. Pat. Nos. 4,392,961, 4,661,282, 4,929,381 and 5,149,456), polyethylene imines (DE 3,124,210), polyvinyl oxazolidone (DE 2,814,329), enzymatic systems including peroxidases and oxidases (U.S. Pat. Nos. 5,273,896 and 5,288,765, and WO 91 05 839), oxidants (U.S. Pat. Nos. 4,005,029, 4,123,376, 4,300,897 and 4,338,210), cationic and amphoteric surfactants (U.S. Pat. Nos. 4,239,659 and 4,261,869), as well as propylene oxide reaction products (U.S. Pat. No. 4,389,214). To Applicants' knowledge, however, none of these prior art references meter or attempt to place a limit on the effect of the dye transfer inhibitor upon extraneous dye in the wash liquor. Furthermore, Applicants have become aware of the problem that too much dye transfer inhibitor present in the wash liquor can significantly negate any benefit to be derived from laundry brighteners or fluorescent whitening agents. Taken to the extreme, there is also evidence to suggest that the use of excess dye transfer inhibitor in the wash liquor can actually cause deterioration of non-extraneous dyes present on the items being laundered. In other words, even dyes that do not ordinarily give rise to bleeding in the wash liquor can be attacked by excess dye transfer inhibitor, resulting in faded or non-uniform appearances of the laundered items. To Applicants' knowledge, none of these prior art references teach or claim any restrictions on the amount of dye transfer inhibitor used in the presence of extraneous dyes.

It is therefore an object of the present invention to provide an article for the convenient control of extraneous dyes which may be present in a wash liquor.

It is a further object of the present invention to provide an indicator to manifest the fact that extraneous dyes, which might have otherwise undesirably colored items in the wash, have been successfully prevented from doing so.

It is yet a further object of the present invention to provide a laundry article that can prevent extraneous dyes present in a wash liquor from becoming redeposited onto other items for which such redeposition is undesirable while simultaneously avoiding harmful interactions with other laundry auxiliaries as well as deleterious effects on non-extraneous dyes present on the items, and simultaneously provide a consumer perceptible, preferably visual, manifestation of the successful operation of these processes.

SUMMARY OF THE INVENTION

The present invention relates to a system for removing extraneous, random free-flowing dyes from washing applications by providing a novel unitary dosing article that can freely circulate among items being washed. The article further comprises a dye absorber and a dye transfer inhibitor which are introduced into a wash liquor via a support matrix. The dye absorber maintains a relational association with the support matrix in the wash liquor, whereas the dye transfer inhibitor is delivered up from the support matrix to the wash liquor and may be evenly distributed throughout the wash liquor. The article of the present invention is in one embodiment a laundry article which provides a method for preventing the redeposition of extraneous dyes onto other wash items, while simultaneously providing an indicator system for the manifestation of such scavenging process.

DETAILED DESCRIPTION OF THE INVENTION

Unless specifically indicated otherwise, all amounts given in the text and the examples which follow are understood to be modified by the term "about", and those figures expressed in terms of percent (%) are understood to refer to weight-percent.

The present invention is concerned with a dye absorber and a dye transfer inhibitor which are introduced into a liquid bath or wash water environment to diminish the deleterious effects of dyestuffs or colorants that are given up by laundry items in the bath. Expressed differently, the laundry article of the present invention is comprised of a dye absorber and a dye transfer inhibitor together with a suitable carrier or support matrix therefor. One feature of the present invention, therefore, is that it addresses the presence of free flowing dyes or colorants in a liquid bath and essentially prevents the same from becoming associated with other materials in the same bath or wash water, such that undesired color or dye is not imparted to such materials. A second attribute of the present invention is that it provides a means for discerning that some finite amount of dye transfer has, in fact, taken place within the liquid bath. This is accomplished in the present invention by having the dye absorber impart a visual color change to the support matrix, thereby causing a perceptible visual variation in the "before" and "after" appearance of the matrix. In addition, according to one preferred embodiment of the present invention, neither the dye absorber nor the dye transfer inhibitor are deleterious to or cause destruction of dyes initially located on the surfaces of the items to be laundered.

The dye absorber of the present invention is any substance that has a high tinctorial affinity for extraneous, free-flowing dyes or colorants in a liquid bath. More particularly, a dye absorber is a substance that scavenges dyes from the surrounding bath liquor and is therefore employed for its properties as a "dye take-up" substance. The dye absorber of the present invention also has the ability to impart a color to the underlying support matrix when used in a wash application. The combination of dye absorber and support matrix will subsequently be referred to together as the "signal." A color change in the signal thus functions as an indicator which provides visible evidence to a user of a laundry article according to the present invention that some color bleeding took place in the wash, and that extraneous dye was scavenged from the wash liquor. It is anticipated, and within the scope of the present invention, that the dye absorber imparts a color or hue to the signal by any of a number of possible mechanisms. Examples of such possible mechanisms include, but are not necessarily limited to, holding onto, adsorbing or absorbing, reacting with, ion pairing, hydrogen bonding, complexation, binding with or otherwise tying up a dye or colorant in or on the support matrix.

The dye transfer inhibitor is a counterpart to the dye absorber and performs a complementary function. While the dye absorber is initially introduced into the wash liquor by and remains associated with the support matrix, the dye transfer inhibitor is any substance which may be found anywhere in the wash liquor of a liquid bath and complexes, holds, binds, reacts, ion pairs, hydrogen bonds, reduces the redeposition affinity of, complexes with or otherwise ties up a dye or colorant in the wash liquor. The dye transfer inhibitor is introduced into the wash environment by the support matrix and subsequently becomes dissociated from it once it is within the wash liquor bath. This gives rise to a relatively uniform distribution and therefore relatively uniform concentration of the dye transfer inhibitor throughout the wash as it freely dissociates within the wash liquor. By contrast, the dye absorber is essentially confined to the locality of the support matrix, and is therefore not uniformly distributed throughout the wash.

The support matrix fulfills the dual function of delivery system and visual aid. As a delivery system, the support matrix is responsible for introducing the dye absorber and the dye transfer inhibitor into the bath or laundering wash water. The dye absorber remains essentially associated with the support matrix, while the dye transfer inhibitor is essentially delivered up from the matrix to the surrounding wash liquor. As a visual aid, the support matrix further acts as a substrate upon which the dye absorber can impart a color change. A change in color of the matrix is therefore an indication that a number of processes have taken place; first, that extraneous or fugitive dyes have arisen from one or more items in the wash and second, that the dye absorber has recorded the presence of these extraneous dyes on the support matrix. Third, a color change of the support matrix provides subsequent manifestation that redeposition of extraneous dyes has successfully been prevented in the wash bath due to the presence of the dye transfer inhibitor in the wash liquor and the presence of the dye absorber on the signal.

Further features of the dye absorber, the dye transfer inhibitor and the support matrix will now be addressed individually.

Dye Absorber

A dye absorber according to the present invention is a substance that is introduced into a liquid laundry bath by a carrier or support matrix and that also remains associated with that matrix throughout the washing process. The nature of the relationship by which the dye absorber is associated with the support matrix may be characterized by one or more of the following: binding, adsorption or absorption; hydrogen bonding; electrostatic forces such as ion/ion or ion/dipole interactions; intercalation, incorporation or insertion therein; chemical or physical bonding, etc.; or any suitable combination thereof. The dye absorber may be introduced into or onto the support matrix by any of a variety of wet or dry techniques which include, but are not necessarily limited to, the following: direct chemical reaction; coupling via an intermediary; precipitation; melting; entanglement with the structure; impregnation; techniques employing pH, temperature, pressure or ultrasound; the use of electromagnetic energy further characterized as infrared (IR), ultraviolet (UV), microwave or plasma; or any combination thereof.

Besides scavenging or absorbing extraneous dyes from the wash solution, an additional function of the dye absorber is to impart a color change to the support matrix with which it is associated, and via which it is delivered to a wash application according to one method of the present invention. As described earlier, the term "signal" is used herein to refer to the dye absorber-support matrix combination of the present invention. The extent of the color change which is associated with the signal, referred to herein as the "color signal," is a function of the particular dye absorber used, the composition of the support matrix, the amount and type of dye or dyes in the wash liquor, wash temperature, detergent formulation and the length of time that the signal is exposed to the wash liquor.

Materials which are suitable as dye absorbers for the laundry article of the present invention include: (quaternary N-substituted ammonium)-hydroxy-haloalkyl compounds such as 2-hydroxy-3-chloropropyltrimethylammonium chloride; salts of epoxyalkyl ammonium compounds such as glycidyltrimethylammonium chloride, which is described in U.S. Pat. No. 4,380,453; polyquaternary ammonium compounds; polyamphoterics; quaternized starches; proteins;

chitin or its hydrolyzed form, chitosan; choline chloride; polyvinyl amine (PVAm); polyethylene imine (PEI); as well as combinations thereof.

Dye Transfer Inhibitor

A dye transfer inhibitor (or DTI) according to the present invention is any solubilized or dispersed substance which prevents the undesirable discoloration of items in a wash liquor by extraneous or free flowing dyes that have been given up by items being laundered. The dye transfer inhibitor can achieve this goal by a variety of techniques including, but not necessarily limited to: suspending the dye in the wash liquor; solubilizing the dye in such a manner that it is unavailable for re-deposition onto a wash item; reducing the affinity of the dye for a textile substrate; fixing the dye to the fabric; trapping the dye; precipitating out the dye; etc. Alternately, the dye transfer inhibitor may also adsorb, absorb, or otherwise become associated with any extraneous dyes present in the wash solution in a manner similar to the functioning of the dye absorber. The alternate terms "take-up", "eliminate", "scavenge" and "sequester" are understood to be equivalent terms that will be used herein to refer to the mechanism or mechanisms by which the dye transfer inhibitor is responsible for preventing undesirable bleeding or color re-deposition of extraneous dye or dyes in the wash liquor from taking place onto wash items from which the dyes or colorants did not originate.

The dye transfer inhibitor is introduced into the wash liquor by the laundry article of the present invention whereupon it is dissociated from the support matrix, thus losing whatever association it may have initially had with the support matrix. One feature of the support matrix is therefore its ability to function as both a delivery device and a dosing vehicle. Accordingly, the appropriate amount of dye transfer inhibitor can be conveniently added to the laundry bath or wash liquor with each washload as a single use item. According to one embodiment of the present invention, the proportion of dye transfer inhibitor which is delivered to the wash liquor by the support matrix is very large in comparison with the amount of dye transfer inhibitor initially present. Relative to the amount of dye transfer inhibitor initially present on a laundry article of the present invention, more than 70%, preferably more than 80%, and most preferably more than 90% of the dye transfer inhibitor is delivered to the wash liquor in a typical wash application.

A key feature of the present invention is that the total amount of dye transfer inhibitor which is delivered should be less than the amount required for complete removal of all extraneous dyes from the wash liquor. One reason for this is that the dye absorber requires a small amount of extraneous dye in order to give rise to the color signal and thus indicate successful functioning of the laundry article of the present invention, as discussed further below. Applicants have further been made aware of the fact that if there is too much dye transfer inhibitor present in the wash liquor, the dye transfer inhibitor can effect premature fading of the fabric. Without being bound by theory, Applicants believe that this is due to disruption of the equilibrium between dye on the fabric and dye released into solution. Thus, dye transfer inhibitors which scavenge extraneous dyes to too large an extent force the equilibrium such that more dye is released from the fabric.

Further, regardless of the total amount of extraneous dye which could be prevented from redepositing on other wash articles by the dye transfer inhibitor, it is desirable that a certain amount of dye remain available to the dye absorber in order for there to be an observable color change in the appearance of the support matrix with which it is associated. Applicants have observed that when enough dye transfer inhibitor is added to completely remove extraneous dye, the dye transfer inhibitor may significantly decrease the amount of fluorescent whitening agent deposited on wash items and adversely affect perceived cleaning properties of the detergent. Without being bound by any particular theory, Applicants believe that this is because the dye transfer inhibitor can diminish the fluorescent whitening or brightening features of existing laundry detergents. This may be due to a competitive interaction between the DTI and the brightener. In fact, Applicants have been led to believe that several European detergents targeted for colored laundry use have removed brighteners from their formulations altogether so that the performance of dye transfer inhibitors is in no way diminished with regard to dye transfer. An alternate theory that may explain the competition between fluorescent whiteners and dyes for DTI complexation is that the fluorescent whitening agents may be absorbed into the DTI, leaving the DTI with reduced capacity to absorb or scavenge colored dyes.

The dye transfer inhibitor should therefore permit a finite amount of extraneous dye to be taken up by the signal to generate a color signal as evidence that a dye-scavenging function has taken place. Expressed differently:

$$D_{tot}=D_{dti}+D_{abs}+D_{rem}=100\% \quad \text{(Equation I)}$$

where:

$D_{tot}$ is the total amount of extraneous dye given up by all laundry items in a wash application;

$D_{dti}$ is the amount of extraneous dye scavenged from the wash liquor by the dye transfer inhibitor;

$D_{abs}$ is the amount of extraneous dye scavenged from the wash liquor by the dye absorber; and $D_{rem}$ is the amount of any extraneous dye remaining in the wash liquor if $D_{tot}\neq D_{dti}+D_{abs}$.

The values for $D_{tot}$, $D_{dti}$, $D_{abs}$ and $D_{rem}$ in Equation I may be determined by colorimetric methods according to standard procedures. The relative magnitude for the above parameters may be given by Equation II:

$$D_{dti}+D_{abs}>>D_{rem} \quad \text{(Equation II)}$$

In one embodiment of the present invention, the value for $D_{rem}$ is zero (0).

A better appreciation for the scope of the present invention may be gained upon closer examination of the relationships indicated in Equation II above in light of certain prior art. In U.S. Pat. No. 4,380,453 (the U.S. Pat. No. '453 patent), for example, it was disclosed and claimed that a cellulose-supported dye scavenging material could be used to control undesirable or random dye transfer in a liquid bath. The dye scavenging material that was taught and claimed comprised a quaternary 2-hydroxy-3-halopropyl compound. However, from a study using increasing numbers of signal sheets according to the U.S. Pat. No. '453 patent, Applicants have demonstrated that the performance of the U.S. Pat. No. '453 product is far from optimal. For instance, in order to achieve the same dye transfer inhibition performance as approximately 1.75 grams of PVP incorporated onto a signal/DTI sheet according to one embodiment of the present invention, Applicants determined that approximately 32 individual 8 in.×11 in. signal sheets according to the U.S. Pat. No. '453 patent would be required. Additional studies confirmed that the levels of dye transfer inhibitor introduced onto a signal sheet to generate a signal/DTI sheet could be optimized to simultaneously achieve an effective color signal, inhibit dye transfer, offer good handfeel and provide a reasonable sheet size at a reasonable cost, while not adversely affecting cleaning, brightening or whitening performance of the detergent in the wash liquor.

Materials which may be acceptable as dye transfer inhibitors include, but are not necessarily limited to: polyvinyl pyrrolidone (PVP); polyvinyl alcohol (PVA); polyvinyl imidazole (PVI); polyamine-N-oxides such as polyvinylpyridine-N-oxide; hydrophobicly or cationicly modified PVP; copolymers of any of the foregoing; cationic starches; minerals such as magnesium aluminate and hydrotalcite; proteins and hydrolyzed proteins; polyethylene imines; polyvinyl oxazolidone; enzymatic systems including peroxidases and oxidases; oxidants; cationic and amphoteric surfactants; as well as propylene oxide reaction products; polyamino acids such as polyaspartic acid or polyhistidine; block co-polymers of ethylene oxide and propylene oxide, for example, those known by the trade name Pluronic® (BASF); polyamines and polyamides; cationic starches; methyl cellulose; carboxyalkyl celluloses such as carboxymethyl and carboxyethyl cellulose; guar gum and natural gums; alginic acid; polycarboxylic acids; cyclodextrins and other inclusion compounds; and mixtures thereof, etc. In addition to the foregoing, and depending on processing steps and/or conditions, certain dye transfer inhibitors may also be comprised of the same material as the dye absorber, and vice-versa.

The amount of dye transfer inhibitor which is delivered by the support matrix to the wash liquor according to one embodiment of the present invention is sufficient to provide approximately 1 to 1000 ppm dye transfer inhibitor, more preferably 2 to 750 ppm and most preferably 5 to 500 ppm dye transfer inhibitor in the wash liquor. It is to be noted that the dye scavenging efficiency of the dye transfer inhibitor in question will ultimately determine the amount of a particular dye transfer inhibitor that should be used.

Support Matrix

The dye absorber and the dye transfer inhibitor described above are supported on an appropriate vehicle or support matrix. This gives rise to a dual function for the support matrix of the present invention. One feature of the support matrix is that it acts as a conduit for the delivery of a dye transfer inhibitor to a laundry wash liquor. In this regard, the dye transfer inhibitor is associated or affiliated with the support matrix in some appropriate manner such that the dye transfer inhibitor may be delivered up from the support matrix to the washing liquor, and subsequently ceases to be associated with the support matrix. A second feature of the support matrix is that it acts as a substrate to which the dye absorber may impart a color such that the two function together as a signal which can indicate that extraneous dyes have, in fact, been scavenged from the washing liquor and therefore that dye carry-over to other items in the wash has been avoided. Addition of one or more dye transfer inhibitors to a signal sheet therefore gives rise to the descriptive term "signal/dye transfer inhibitor" or "signal/DTI" for reference to the laundry articles of the present invention. Additionally, the support matrix may be used as a vehicle to deliver other adjuncts such as, but not necessarily limited to, brighteners, surfactants, builders, enzymes, anti-static agents, softeners, etc.

The support matrix which may be used in accordance with the present invention can be comprised of any type of natural or synthetic material with which a dye absorber and a dye transfer inhibitor may become associated, provided that the material used has the attributes that it can both deliver the dye transfer inhibitor to the washing liquor and also retain some association with the dye absorber. Further to its function as a carrier for the dye absorber, the purpose for the support matrix is to provide a sufficient surface area upon which the dye absorber is accessible to the bath or wash liquid in which the laundry article is to be used. It is also preferred that the total surface area of the support matrix be less than about 500 $in^2$ (3225 $cm^2$). Materials which may be suitable for support matrices of the present invention include both cellulosic and non-cellulosic fibers in both woven and non-woven form. In the case of certain non-woven materials that do not exhibit good wash strength, it may be desirable to use auxiliaries, such as binders, to enhance the durability of the support matrix. Non-woven rayon is one such example of a material with low wash strength which may benefit from the addition of binders.

In general, it is preferred that the support matrices be comprised of substances that have absorptive capacity or contain reactive groups due to the ability of the latter to achieve a good visible color indication on the laundry articles of the present invention. In this context, reactive groups are understood to refer to moieties such as hydroxyl, acetyl and carboxyl groups, as well as derivatized species thereof such as acetates, amines, and so forth. It has been determined that cellulosics such as wood pulp, rayon and cotton are especially effective substances, besides having the additional advantage that they are available at relatively low cost. It has further been determined that acetates are also suitable, especially monoacetates. Synthetic polymeric materials such as polyester, polyethylene and polypropylene may be used as support matrices alone or in combination with other support matrices as additives to improve fabric wash strength under standard washing conditions. Synthetic polymers are generally regarded as nonreactive towards the incorporation of dye absorbers. Applicants have found that incorporation of auxiliaries with reactive groups, such as PVA, with these polymeric materials to form support matrices may be beneficial. In fact, the use of reactive binders can permit the use of greater amounts of polymeric materials such as polyester, polyethylene and polypropylene. Other factors that are important in selecting a suitable support matrix include such considerations as durability, handfeel, processability and cost. The signal/DTI laundry article should not lint, excessively tear or fall apart during the wash process, nor should it ball up or be heat sensitive to the point of self-destruction during post-washing drying.

The support matrix is considered to deliver the dye transfer inhibitor to the wash liquor according to the present invention when the amount of dye transfer inhibitor that remains associated with the support matrix, as compared to the total starting amount of dye transfer inhibitor associated with the support matrix, is less than 20%, 15%, 10%, 7%, 4%, 2%, 1%, 0.5%, 0.1% with increasing preference in the order shown. Conversely, the support matrix is considered to function as a carrier for the dye absorber when the amount of dye absorber that remains associated with the support matrix in the wash liquor, as compared to the total starting amount of dye absorber associated with the support matrix, is 80%, 85%, 90%, 93%, 96%, 98%, 99%, 99.5%, 99.9% with increasing preference in the order shown.

The form in which the support matrix may be found for purposes of the present invention is virtually limitless. In one relatively simple embodiment according to the present invention, the support matrix may consist of a fiber or filament. A dye absorber may be introduced onto the fiber, which may subsequently be incorporated in woven or non-woven form to generate a sheet. Other forms for the support matrix which are consistent with the laundry article of the present invention include such configurations as fiber balls or beads and clathrates or other forms of intercalation supports in addition to the more conventional sheet form. Ultimately, any item or object that can conveniently be retrieved from a wash load, either after washing or after drying would be appropriate.

Although the amount of extraneous dye that will be taken up by the signal will depend on the particular dye absorber and support matrix used, it is preferred that the dye absorber take up or in other words remove enough extraneous dye from the wash liquor such that there is at least a 10% increase in the calculated value of delta E ($\Delta E$) for a signal washed in the presence of a dye source as compared to a support matrix without a dye absorber present (i.e., a virgin support matrix) washed in the presence of the same dye source. $\Delta E$ averages the reflectance changes of an item prior to and after washing according to:

$$\Delta E=[(L_w-L_o)^2+(a_w-a_o)^2+(b_w+b_o)^2]^{1/2} \quad \text{(Equation III)}$$

where:

L=reflectance;

a=redness/greenness;

b=yellowness/blueness;

w=fabric after washing;

o=fabric before washing.

Larger $\Delta E$ values indicate greater levels of dye absorption. An alternate way to regard the function of the dye absorber is to consider the dye absorber-support matrix combination, or signal, as functioning in a synergistic manner to prevent redeposition of at least 5% of the extraneous dyes present in the wash liquor from redepositing on other wash items. In a more preferred embodiment of the present invention, the dye absorber or signal will prevent redeposition of at least 10% of the extraneous dyes, and in a most preferred embodiment, the dye absorber or signal will prevent redeposition of at least 15% of the extraneous dyes.

As for the functioning of the dye transfer inhibitor, it is preferred that the dye transfer-inhibitor take up, complex with, or otherwise prevent that amount of extraneous dye in the wash from undesirable redeposition which would give rise to a maximum of 75% reduction in the value of $\Delta E$ for the signal alone. In other words, combining a dye transfer inhibitor with a signal to give rise to a signal/DTI product of the present invention should result in an observed value for $\Delta E$ for the signal that is at least 25% of the value for $\Delta E$ that would be observed in the same wash conditions in the absence of the dye transfer inhibitor. With respect to the dye transfer inhibitor, it is preferred that the amount of dye scavenged, complexed by, taken up or bound up, solubilized, sequestered, preferentially complexed with, or otherwise prevented from redepositing is 25% or more of the extraneous or fugitive dyes present in the wash liquor according to one embodiment of the present invention. In one embodiment of the present invention, the dye transfer inhibitor alone will prevent redeposition of 25% of the extraneous dyes, preferably 30% and most preferably 50% of the extraneous dyes.

The laundry article of the present invention may thus provide the following advantages over related prior art articles: 1) considerably smaller amounts of dye absorbers and smaller support matrices may be used to achieve the same level of prevention of dye carry-over as is obtained with dye absorbers hitherto because of the presence of the dye transfer inhibitor and its greater effectiveness at scavenging extraneous dye; and 2) smaller support matrices are possible due to the synergistic benefits of dye absorber and dye transfer inhibitor functioning together. This correspondingly leads to lower costs and reduced waste for the support matrices, thus providing additional environmental benefits.

The present invention will be further understood by reference to the following specific Examples. As will be readily apparent to one skilled in the relevant art, the Examples are illustrative only, and represent a sampling of the various parameters and compositions which may be used in accordance with the present invention without limiting the scope of the invention in any way. Unless otherwise indicated, all percentages, parts and ratios are expressed in terms of weight.

EXAMPLE SET I

A number of experiments were conducted in which different materials were used to introduce a dye absorber onto a support matrix which, according to one embodiment of the invention, further comprises a fabric substrate. Incorporation of the dye absorber onto the fabric substrate was achieved via use of either a coupling agent or a self cross-linking polymer. Buffers, catalysts and wetting agents were used where indicated to enhance coupling of the dye absorber to the substrate. For purposes of the discussion below, the combination of dye absorber and fabric substrate will subsequently be referred to as the "signal." Signals prepared according to the following procedure were white in color after being rinsed in water and air dried. An item that gives up color to the wash is known as a dye "source", or "source sheet." When a signal is washed in the presence of a source sheet, any dye that is picked up by and imparts a color to the signal gives rise to the term "signal color."

Standard Preparation of Signals for Example Set I

In each of Examples I-1 through I-16 below, a 90 square inch signal was prepared by dipping a swatch of a fabric substrate into an aqueous mixture of the components indicated; usually for less than one minute. The fabric used was a 54% wood pulp-46% polyester blend known commercially as Fabric Style 8838 (available from E.I. Du Pont de Nemours Co.), which had a nominal basis weight of 1.5 ounces per square yard. The swatches were dipped into the mixtures at room temperature, except where noted. The signals were then processed using a laboratory Werner Mathis pad and pin tenter frame. As will be familiar to those knowledgeable in the textile field, padding is a process whereby a substrate is dipped into a bath and then passed between two nip rollers in order to force penetration of the liquid into the substrate and remove excess liquid. The padding pressure was 4 bar, except where noted to the contrary. After padding, the outside edges of the signal fabric were pinned onto a frame and the fabric was passed horizontally through a forced air oven to cure. Oven temperatures and curing times are indicated in Table I below.

TABLE I

| Example No. | Mixture Components | Oven Temperature (°F.) | Cure Time (sec.) |
|---|---|---|---|
| I-1 | 100 g Reten ® 203, 50 g Polycup ® 1884, 250 g water | 300 | 60 |
| I-2 | 200 g Callaway 4030, 20 g Z-6040 Silane, 4 g acetic acid (20%), 200 g water | 350 | 60 |
| I-3 | 200 g Polymer VRN, 5 g Stahl KM 101898, 195 g water | 300 | 15 |
| I-4 | 200 g Polymer VRN, 5 g Stahl WU 5345, | 300 | 15 |

TABLE I-continued

| Example No. | Mixture Components | Oven Temperature (°F.) | Cure Time (sec.) |
|---|---|---|---|
| | 195 g water | | |
| I-5 | 400 g Polycup ® 172 adjusted to pH 8 with dimethyl-aminomethyl propanol (DMAMP) | 250 | 15 |
| I-6 | 400 g Polycup ® 172 adjusted to pH 9.5 with aminomethyl propanol (AMP) | 250 | 15 |
| I-7 | 400 g Polycup ® 1884 adjusted to pH 9.4 with aminomethyl propanol | 250 | 15 |
| I-8[a,b] | 209 g Jayfloc 835, 140 g Permafresh ® Lo Conc, 42 g Catalyst 531, 5 g 1-methyl-2-pyrrolidone, 2 g Mykon NRW-3, 2 g Surfadone ® LP-100 | 353 | 30 |
| I-9 | 70 g Permafresh ® Lo Conc, 21 g Catalyst 531, 4 g Surfadone ® LP-100, 2 g Mykon NRW-3, 5 g 1-methyl-2-pyrrolidone, 135 g Merquat ® 100, 200 g water | 350 | 30 |
| I-10[a] | 135 g Cartaretin F-23, 70 g Permafresh ® Lo Conc, 21 g Catalyst 531, 4 g Surfadone ® LP-100, 2 g Mykon NRW-3, 5 g 1-methyl-2-pyrrolidone, 200 g water | 350 | 30 |
| I-11 | 7 g UCARE ® Polymer JR-30M, 35 g Permafresh ® Lo Conc, 10.5 g Catalyst 531, 4 g Surfadone ® LP-100, 2 g Mykon NRW-3, 5 g 1-methyl-2-pyrrolidone, 600 g water | 350 | 30 |
| I-12 | 7 g UCARE ® Polymer SR-10, 35 g Permafresh ® Lo Conc, 10.5 g Catalyst 531, 4 g Surfadone ® LP-100, 2 g Mykon NRW-3, 5 g 1-methyl-2-pyrrolidone, 600 g water | 350 | 30 |
| I-13 | 135 g Reten ® 203, 45 g Permafresh ® Lo Conc, 13.5 g Catalyst 531, 10 g Variquat K1215, 200 g water | 350 | 30 |

Notes to Table I:
[a]The mixture was heated to 120° F. prior to dipping the fabric.
[b]The padding pressure in Example I-8 was 1 bar.

Description of Materials Used in Example Set I

Quaternary ammonium polymer resins

Callaway 4030 is a dimethylamine epichlorohydrin type polymer (Callaway Co.). Cartaretin F-23 is an adipic acid/dimethylaminohydroxypropyl diethylenetriamine copolymer (Sandoz Chemicals Corp.). Jayfloc 835 is a low molecular weight dimethylamine epichlorohydrin polymer (Callaway Co.). Merquat® 100 is a 40% aqueous solution of the homopolymer of dimethyldiallyl ammonium chloride (Calgon). Both UCARE® Polymer JR-30M and UCARE® Polymer SR-10 (both from Amerchol) are polymeric ammonium salts of hydroxyethylcellulose reacted with a trimethyl ammonium substituted epoxide. Polymer JR-30M has a viscosity of 1,000–2500 centipoise (cps) and Polymer SR-10 has a viscosity of 8,000–12,000 cps. Polymer VRN is a quaternary oligomer based on dimethylamine and epichlorohydrin (Sandoz Chemicals). Reten® 203 is a low-to-medium molecular weight, high charge density cationic resin (Hercules Incorporated).

Cross-linkers

Permafresh® Lo Conc is a modified imidazolidinone (Sequa Chemicals, Inc.). Z-6040 Silane is a glycidoxy (epoxy) functional methoxy silane (Dow Corning Corp.). Stahl KM 101898 is a polymeric aziridine and Stahl WU 5345 is a low temperature coupling agent.

Self-linking resins

Polycup® 1884 and Polycup® 172 are water soluble, polyamide epichlorohydrin type materials effective as cross-linking agents for certain lattices and other water-soluble polymers (Hercules, Inc.).

Catalysts

Catalyst 531 is a magnesium chloride/citric acid catalyst (Sequa Chemical Co.).

Buffers

Acetic acid was used as a 20% solution. Aminomethyl propanol (AMP) and dimethylaminomethyl propanol (DMAMP) are both bases which were used as received.

Wetting Agents

Mykon NRW-3 is an amphoteric amide-based surfactant (Sequa). 1-Methyl-2-pyrollidone was used as received (Fisher Scientific). Surfadone® LP-100 is n-octyl pyrrolidone (International Specialty Products). Variquat K1215 is a methyl bis(polyethoxy ethanol) coco ammonium chloride surfactant (Witco Co.).

EXAMPLE I-14

An unwashed sample of the signal from Example I-2 was padded through a 30% polyvinyl pyrrolidone solution (PVP K-30 International Specialty Products, formerly GAF Chemicals Corp.), to give Example I-14 with a wet pick-up of approximately 110%. Signals and targets from I-2 and I-14 were evaluated before and after washing according to the method described below. The signal of I-14 was 5 units lighter than the signal of I-2, and the target of I-14 was 4.6 units lighter than that of I-2 (see Table II below).

EXAMPLE I-15

In this Example, the signal was prepared from a 90 square inch sample of a non-cellulosic fabric, Sontara 8005 (100% polyester, 2 oz./sq. yd.). The signal was padded with a mixture comprised of 135 g Callaway 4030, 140 g Permafresh® Lo Conc, 42 g Catalyst 531, 1 g citric acid and 82 g water to give a dry add-on of 115%. This sample was laundered as described below. Values for ΔE are reported in Table II.

EXAMPLE I-16

One and one half grams (1.5 g) of a PVP K-30 LUVISKOL® solution (BASF) were added to a washload that contained a sample prepared according to Example I-15 and laundering proceeded as described below. ΔE values are reported in Table II.

Laundering and Performance Evaluation of Example Set I

Signals were prepared according to Table I above. To each washload were added three pounds of ballast (1.5 lbs rayon and 1.5 lbs polyester), an 8 in.×8 in. target fabric (4.4 oz greige unmercerized cotton twill), and a fabric that released approximately 0.1 grams of Direct Red 80 (Solophenyl Red 3BL from CIBA). The purpose of the target fabric was to serve as a dye receptor for any extraneous dye which was not absorbed by the signal (or not taken up by the dye transfer inhibitor in those Examples which included a dye transfer inhibitor). The entire complement was washed with 65 g of Ultra Tide® laundry detergent. Washing conditions were medium water level in warm water with a cold water rinse using a Kenmore Heavy Duty 80 series washing machine.

Signals were evaluated for dye scavenging ability by comparing readings before and after laundering using an Applied Color Systems Chroma Sensor CS3 spectrophotometer (Hunter difference, 10° observer) using a Cool White Fluorescent light source. The extent of dye transfer was measured in terms of ΔE according to Equation III above, and are given in Table II below.

TABLE II

| Example No. | ΔE Signal | ΔE Target |
|---|---|---|
| I-1 | 16.1 | 5.4 |
| I-2 | 35.0 | 7.8 |
| I-3 | 9.6 | 6.7 |
| I-4 | 10.3 | 8.2 |
| I-5 | 13.8 | 6.0 |
| I-6 | 16.3 | 7.9 |
| I-7 | 14.4 | 6.5 |
| I-8 | 27.4 | 12.8 |
| I-9 | 26.2 | n.a. |
| I-10 | 15.0 | n.a. |
| I-11 | 15.5 | n.a. |
| I-12 | 14.3 | n.a. |
| I-13 | 19.2 | n.a. |
| I-14 | 30.0 | 3.2 |
| I-15[a] | 31.8 | 10.1 |
| I-16[a] | 23.9 | 6.0 |
| Control[b] | 8.1 | n.a. |

Notes to Table II
n.a. indicates information not available.
[a]Non-cellulosic fabric.
[b]Virgin support matrix.

While dye absorbers of the prior art have heretofore been complexed primarily to cellulosic fabrics, the data from Example Set I above indicate that dye absorbers may successfully be incorporated onto low cellulosic fabrics as well as non-cellulosic fabrics. The above data also suggest that such low- or non-cellulosic dye absorber-substrate combinations can function as effective signals to scavenge extraneous dye in a laundry wash situation and provide a visual indication to that effect. To Applicants' knowledge, these results further suggest that there exist a variety of promising new techniques for incorporating dye absorbers onto non-cellulosic signals. The techniques reported herein are unique in that a coupling agent or a self cross-linking polymer can be used to complex a dye absorber to a matrix support in the form of a fabric, resulting in an absorber/DTI laundry article. This creates a virtually limitless possibility for the use of different fabric substrates as dye absorber support matrices in future wash applications.

EXAMPLE SET II

Wash studies were conducted using laundry articles that represented different embodiments of the present invention. In the Examples which follow, signal sheets were generally prepared according to representative Step A, and signal/DTI sheets were prepared according to Step B, except where indicated otherwise. For certain combinations of dye absorber, dye transfer inhibitor and support matrix, it may be possible to combine more than one processing step into a single operation.

Step A

Fabric swatches with both high and low cellulose content were immersed into an aqueous solution containing 4% sodium hydroxide and 17% QUAB® 188 (2-hydroxy-3-chloropropyl-trimethylammonium chloride; Degussa) by weight, unless indicated below to the contrary. There were no discernible differences in appearance and durability of the signal swatches produced whether dipping times were on the order of a few seconds or a few hours. The swatches were generally 8 in.×11 in. and weighed approximately 2.85 g/sheet. After immersion in the above solution, the sheets were rinsed with water and dried. In certain instances, swatches were further rinsed with 5% HCl or acetic acid followed by a final water rinse. Swatches were generally air dried, but other drying techniques such as passing over heated cans or rollers, hot air or steam drying, etc., may also be employed.

Step B

Dye transfer inhibitors were added to quaternized fabric signals resulting from Step A by dipping or padding the signal swatches with an aqueous solution containing a suitable dye transfer inhibitor such as PVP, PVA or other appropriate dye transfer inhibitor material described earlier. Where PVP was the dye transfer inhibitor used, the dry weight pick-up of PVP was approximately 1.25 grams per 88 sq. in. sheet. The resulting signal/DTI sheets appeared white in color.

Laundering Conditions

Signal/dye transfer inhibitor sheets were washed in simulated laundry washloads that contained 6 pounds of a cotton-polyester ballast, cotton target swatches to evaluate dye transfer, and dye source sheets further consisting of cotton sheets dyed with Direct Red 79 that had known bleeding potential. Approximately 1.5 millimoles bicarbonate and 65.3 g Ultra TIDE® detergent were added and water hardness was adjusted to approximately 100 ppm calcium/magnesium ions during the wash studies. The wash was a warm water wash with a cool water rinse. The signal sheets were observed to turn various shades of pink to red, either at the conclusion of the wash cycle or upon subsequent drying, which indicated that stray dyes had indeed been scavenged. The pink color signal could be instrumentally measured by standard colorimetric procedures. A Hunter Laboratory Colorimeter fitted with a UV filter to prevent interference by fluorescent whitening agents (FWA's) was used to measure pre- and post-wash values for L, a and b according to Equation III above. ΔE values were calculated for comparison purposes. Representative values are shown in Table III.

EXAMPLE II-1

Signal sheets prepared according to Step A and consistent with the teaching of U.S. Pat. No. 4,380,453 were tested for the ability to inhibit dye transfer in a wash application. A level study using increasing quantities of signal sheets demonstrated that it would take approximately 32 individual 8 in.×11 in. signal sheets to equal the same dye transfer inhibition performance as 1.75 grams of PVP incorporated onto a signal/DTI swatch according to one embodiment of the present invention. Additional studies confirmed that the levels of dye transfer inhibitor introduced onto a signal sheet to generate a signal/DTI sheet could be optimized to simultaneously achieve an effective color signal, inhibit dye transfer, offer good handfeel and provide a reasonable sheet size at reasonable cost and detergent performance levels.

EXAMPLE II-2

Parallel wash studies were conducted in which signal/DTI sheets had been added to a first series of washloads but omitted from a second. The amount of dye transferred to the target swatches in the loads with the signal/DTI sheets was dramatically reduced compared to the amount of dye transferred to the target swatches in the wash loads without the signal/DTI sheets. Values for ΔE observed for virgin support matrix, signal (support matrix plus dye absorber) and signal/DTI (support matrix plus dye absorber plus dye transfer inhibitor) are given in Table III below.

TABLE III

| | Signal ΔE | Target ΔE |
|---|---|---|
| Virgin Support Matrix | 1.5 | 8.7 |
| Support Matrix + Dye Absorber | 43.3 | 7.8 |
| Support Matrix + Dye Absorber + Dye Transfer Inhibitor | 26.6 | 1.4 |
| Least Significant Difference (95% confidence level) | 1.3 | 2.0 |

EXAMPLE II-3

Signal/dye transfer inhibitor sheets from a variety of fabrics were prepared according to Steps A and B above. The fabrics which were used consisted of both cellulosic and non-cellulosic fibers as well as other auxiliaries, such as binders, to enhance durability. Fabrics that contained reactive groups were determined to be more desirable for achieving good "color signal" of the signal/DTI sheets. In this context, good color signal was generally possible with species that provided reactive groups such as hydroxyl, acetyl and carboxyl groups, etc. Cellulosics such as wood pulp, rayon, cotton, etc., were found to be especially effective and low cost materials. Materials such as polyester and polypropylene may be particularly suitable additives since they tend to improve both fabric wet strength and durability in standard washing conditions as discussed earlier.

EXAMPLE II-4

Fabric samples containing multiple fibers (Multifiber Fabric #43 from Test Fabrics, Inc.) were treated according to Step A above. After being washed together with a dye source, strong bands of pink appeared on the cotton, rayon and mono- and tri-acetate portions of the signals. These are examples of fabric types that can effectively and relatively conveniently react with the QUAB® 188 solution to give rise to useful signal sheets.

EXAMPLE II-5

The procedure outlined above in Step A was carried out for various reaction times. For example, one sample was reacted overnight and another was allowed to react in excess of two days. Although both of these longer-reacted samples produced strong color signals, it was found that reaction times much longer than one hour began to influence fabric durability and only limited color pick-up benefits were obtained. Reaction time may be significantly shortened with the application of heat.

EXAMPLE II-6

The procedure outlined in Step A was modified to evaluate the effects of changes in the sodium hydroxide and QUAB® 188 concentrations. While increasing the levels of hydroxide resulted in better reaction of the QUAB® 188 with the fabric substrate, there was no significant improvement in the reaction above pH 13.5 and, in fact, there were some fabric degradation observed at pH values in excess of 14.0. As expected, increased levels of QUAB® 188 concentration improved "color signal" results.

EXAMPLE II-7

A cellulosic substrate was dipped for 30 seconds into the reaction solution prepared according to Step A, immediately heated between plates at 300° F. for 30 seconds and then rinsed and dried. The change in color of the signal was evaluated after laundering in the presence of a dye source as described above. It was determined that the color signal was similar to that obtained for the 1 hour reaction described in Example II-1.

EXAMPLE II-8

A composite fabric of reactive and nonreactive fibers, such as rayon and polyester, was found to significantly color only the rayon. This Example can be further modified and used to produce specific regions of reacted and unreacted material on a single substrate in order to generate regions of different functionality. Alternately, the procedure in this Example can be further modified such that heat is applied only to those regions of the signal where a color signal is desired. Typical reasons for desiring such regions might be to enhance the color signal impression, introduce a design or logogram that could "develop" onto a signal sheet, conserve reagent cost, etc. Optionally, the reagents may be padded onto selected areas of the signal such that color signals appear only in those areas to which the solution has been added. Yet another method is to purposefully modify the fabric substrate to render it less absorbent in selected regions. For instance, thermal bonding of the substrate tends to leave lighter and darker contrasting dots on the resulting signal after it has been washed with a source sheet. Chemical treatment may also lead to similar results.

EXAMPLE II-9

Signal sheets prepared according to Step A were coated with different levels and types of dye transfer inhibitors. Nonwoven sheets were coated with as much as 215% of its weight and as little as 1% of its weight in dye transfer inhibitor. Incorporation of both PVP, PVA and combinations thereof onto signal sheets were effective in inhibiting dye transfer in the wash while simultaneously exhibiting effective color signal generation. An additional advantage of PVA is that commercially available plasticized films can be laminated onto the signal fabric. It is also possible to include other known dye transfer inhibitors alone or in combination with the foregoing. Examples of such materials include polyvinylpyridinium-N-oxide, polyvinyl imidazole, cellulase and other washing auxiliaries, etc.

EXAMPLE II-10

Copolymers of polyethylene oxide and polypropylene oxide, for example, those known by the trade name Pluronic® (BASF) were found to manifest desirable binding characteristics to certain dyes. In wash studies, these species exhibited additional dye transfer inhibition properties and may be incorporated onto signal/DTI sheets according to one embodiment of the invention.

EXAMPLE II-11

In order to help prevent color loss over many wash cycles, additives such as dye fixatives may be added to signal/DTI laundry articles according to one embodiment of the present invention. These additives have been shown to provide long term color retention benefits.

EXAMPLES II-12 to II-14

In the following three Examples, the QUAB® 188 of Step A was replaced by different dye absorber materials. The substitutions were made as indicated.

EXAMPLE II-12

In Example II-12, chitosan was used as a dye absorber. This material was introduced onto the fabric substrate by dipping it into a solution of chitin that had been solubilized in dilute acetic acid (i.e., 5%). The fabric sample was then rinsed and dried as above. The efficacy of the chitosan containing signal was evaluated under the standard wash conditions described above to indicate that this material could be used effectively as a supported dye absorber.

EXAMPLE II-13

In Example II-13, fabric samples were first dipped into a solution of polyacrylate, followed by treatment with a quaternary ammonium compound, after which they were rinsed and dried as above. Upon washing the signal sheet thus generated in the presence of a dye source, color signals were observed to develop.

EXAMPLE II-14

In Example II-14, polyethyleneimine was used as a dye absorber. This material was introduced onto the fabric substrate via the dipping technique described above in Step A. After standard rinsing and drying, the signal was washed in the presence of a dye source.

EXAMPLE II-15

In Example II-15, a sample of polyester fabric (BOUNCE®, Procter & Gamble), which was treated in order to remove any softening and anti-static actives, was subsequently dipped into a hot solution of 6% PVA and then dried. The resulting PVA-treated polyester fabric was then treated with QUAB® 188 as described in Step A above. The signal picked up significant color and gave rise to ΔE values as reported in Table IV below. Treating the same raw polyester fabric with QUAB® 188 without prior pretreatment with PVA resulted in virtually no color pickup under the laundry conditions described above, confining the relative inertness of polyester fabric toward reaction with epoxides. This demonstrates that the range of possible substrates can be broadened to include those fabrics which one would anticipate to be nonreactive (towards dye absorbers), providing that reactive binders are added, or post-treatment of the fabrics are carried out.

TABLE IV

| | Signal ΔE |
|---|---|
| PVA-Treated Support Matrix + Dye Absorber | 27.5 |
| Support Matrix + Dye Absorber | <2.0 |
| Virgin Support Matrix | <2.0 |

EXAMPLE II-16

In Example II-16, Applicants washed an as-received sample of BOUNCE® (dryer-added fabric softener, Procter & Gamble) according to the laundering conditions described above. Surprisingly, Applicants were unable to discern any significant dye uptake by Example II-16, in contrast to Example II-15. It had been anticipated that there would be some noticeable change in color in Example II-16, since BOUNCE® sheets feature a quaternary ammonium compound on a polyester substrate. If dye scavenging was merely a function of depositing quaternary species onto a suitable substrate, Applicants would have anticipated some dye uptake of the BOUNCE® sheet and a change in color of the sheet. Surprisingly, such was not the case.

The above Examples reveal that the scavenging of extraneous dye in a wash environment may be attenuated by the introduction of a suitable dye transfer inhibitor onto a signal support, and further indicate that various dye absorbers may become associated with a suitable substrate to provide a color signal indicative of the fact that some dye transfer has taken place.

Although specific components and proportions have been stated in the above description of the preferred embodiments of the novel laundry article for preventing dye carry-over in the laundry wherein dye scavengers and a support matrix are used, other suitable materials and minor variations in the various steps in the system as listed herein may be used. In addition other materials and steps may be added to those used herein, and variations may be made in the article to synergism, enhance or otherwise modify the properties of or increase the uses for the invention.

It will be understood that various other changes of the details, materials, steps, arrangements of parts and uses which have been described herein and illustrated in order to explain the nature of the invention will occur to and may be made by those skilled in the art upon a reading of this disclosure, and such changes are intended to be included within the principle and scope of this invention.

What is claimed is:

1. A wash additive article effective for inhibiting transfer of extraneous dyes to items in a wash liquor and for indicating said inhibition, the article comprising a support matrix for introduction into a wash liquor;

a dye absorber, fixably associated with the support matrix and adapted for imparting a detectable color change to the matrix; and a dye transfer inhibitor releasably associated with the support matrix and adapted for preventing undesirable discoloration of items; wherein the support matrix is selected from the group consisting of those that have absorptive capacity, those that contain reactive groups, and mixtures thereof, further wherein the reactive groups comprise hydroxyl, acetyl and carboxyl moieties, derivatized species thereof and mixtures thereof;

the dye absorber is selected from the group consisting of quaternary ammonium-hydroxy-haloalkyl compounds, salts of epoxyalkyl ammonium compounds, polyquaternary ammonium compounds, polyamphoterics, quaternized starches, proteins, chitin, chitosan, choline chlorides, polyvinyl amine, polyethylene imine, and mixtures thereof;

the dye transfer inhibitor is selected from the group consisting of polyvinyl pyrrolidone, polyvinyl alcohol, polyvinyl imidazole, polyamine-N-oxides, cationic starches, magnesium aluminate, hydrotalcite, proteins, hydrolyzed proteins, polyethylene imines, polyvinyl oxazolidone, enzymes, oxidants, cationic surfactants, amphoteric surfactants, propylene oxide reaction products, polyamino acids, block co-polymers of alkylene oxides, polyamines, polyamides, methyl cellulose, carboxyalkyl, celluloses, guar gum, natural gums, alginic acid, polycarboxylic acids, cyclodextrins, and mixtures thereof;

wherein the combination of support matrix and dye absorber results in at least a 10% increase in a ΔE value compared to a ΔE value for the matrix alone; and further wherein the combination of support matrix, dye absorber and dye transfer inhibitor results in at most a 75% reduction in a ΔE value compared to a ΔE value for the matrix and dye absorber combination.

2. The wash additive article of claim 1 further including a cross-linking agent for associating the support matrix with the dye absorber.

3. The wash additive article of claim 1 wherein the support matrix is a fabric sheet.

4. The wash additive article of claim 1 wherein the dye absorber includes a polymeric material.

5. The wash additive article of claim 4 wherein the polymeric material is self-cross-linking.

6. The wash additive article of claim 1 wherein at least about 70% of the dye transfer inhibitor associated with the support matrix is released into the wash liquor.

7. The wash additive article of claim 1 wherein at least about 80% of the dye absorber remains associated with the support matrix.

8. The wash additive article of claim 1, further wherein the article has a surface of not greater than about 3225 $cm^2$.

9. The wash additive article of claim 1, wherein the support matrix further includes a polymeric material.

10. The wash additive article of claim 9, wherein the polymeric material is selected from the group consisting of polyester, polyethylene, polypropylene and mixtures thereof.

11. The wash additive article of claim 1, wherein the support matrix further includes an auxiliary.

12. The wash additive article of claim 11, wherein the auxiliary is polyvinyl alcohol.

13. A method of making a wash additive article effective for inhibiting transfer of extraneous dyes to items in a wash liquor and for indicating said inhibition, the method comprising selecting a support matrix capable of retaining a dye absorber and releasably associating a dye transfer inhibitor, the matrix having a surface area of no greater than about 3225 $cm^2$; and introducing an absorbing effective amount of a dye absorber adapted for imparting a detectable color change to the support matrix and an inhibiting effective amount of a dye transfer inhibitor adapted for preventing undesirable discoloration of items wherein at least about 80% of the dye absorber will remain associated with the matrix and at least about 70% of the dye transfer inhibitor will be released into the wash liquor, wherein the support matrix is selected from the group consisting of those that have absorptive capacity, those that contain reactive groups, and mixtures thereof, further wherein the reactive groups comprise hydroxyl, acetyl, carboxyl moieties, derivatized species thereof and mixtures thereof;

the dye absorber is selected from the group consisting of quaternary ammonium-hydroxy-haloalkyl compounds, salts of epoxyalkyl ammonium compounds, polyquaternary ammonium compounds, polyamphoterics, quaternized starches, proteins, chitin, chitosan, choline chlorides, polyvinyl amine, polyethylene imine, and mixtures thereof;

the dye transfer inhibitor is selected from the group consisting of polyvinyl pyrrolidone, polyvinyl alcohol, polyvinyl imidazole, polyamine-N-oxides, cationic starches, magnesium aluminate, hydrotalcite, proteins, hydrolyzed proteins, polyethylene imines, polyvinyl oxazolidone, enzymes, oxidants, cationic surfactants, amphoteric surfactants, propylene oxide reaction products, polyamino acids, block co-polymers of alkylene oxides, polyamines, polyamides, methyl cellulose, carboxyalkyl celluloses, guar gum, natural gums, alginic acid, polycarboxylic acids, cyclodextrins, and mixtures thereof;

the combination of support matrix and dye absorber results in at least a 10% increase in a ΔE value compared to a ΔE value for the matrix alone; and further wherein the combination of support matrix, dye absorber and dye transfer inhibitor results in at most a 75% reduction in a ΔE value compared to a ΔE value for the matrix and dye absorber combination.

14. The method of claim 13 wherein the support matrix is a fabric sheet.

15. The method of claim 13 wherein the dye absorber includes a polymeric material.

16. The method of claim 15 further including a cross-linking agent to associate the dye absorber with the support matrix.

17. The method of claim 13 wherein the dye absorber and dye transfer inhibitor are added simultaneously to the support matrix.

18. The method of claim 13, wherein the support matrix further includes a polymeric material.

19. The method of claim 18, wherein the polymeric material is selected from the group consisting of polyester, polyethylene and polypropylene.

20. The method of claim 13, wherein the support matrix further includes an auxiliary.

21. The method of claim 20, wherein the auxiliary is polyvinyl alcohol.

22. A method of inhibiting transfer of fugitive dyes during laundering, and of indicating said inhibition, the method comprising introducing to a wash liquor an article comprising a support matrix;

a dye absorber, fixed to the support matrix and adapted for imparting a detectable color change to the matrix; and a dye transfer inhibitor releasably associated with the support matrix adapted for preventing undesirable transfer of fugitive dyes; wherein the support matrix is selected from the group consisting of those that have absorptive capacity, those that contain reactive groups, and mixtures thereof, further wherein the reactive groups comprise hydroxyl, acetyl and carboxyl moieties, derivatized species thereof and mixtures thereof;

the dye absorber is selected from the group consisting of quaternary ammonium-hydroxy-haloalkyl compounds, salts of epoxyalkyl ammonium compounds, polyquaternary ammonium compounds, polyamphoterics, quaternized starches, proteins, chitin, chitosan, choline chlorides, polyvinyl amine, polyethylene imine, and mixtures thereof;

the dye transfer inhibitor is selected from the group consisting of polyvinyl pyrrolidone, polyvinyl alcohol, polyvinyl imidazole, polyamine-N-oxides, cationic starches, magnesium aluminate, hydrotalcite, proteins, hydrolyzed proteins, polyethylene imines, polyvinyl oxazolidone, enzymes, oxidants, cationic surfactants, amphoteric surfactants, propylene oxide reaction products, polyamino acids, block co-polymers of alkylene oxides, polyamines, polyamides, methyl cellulose, carboxyalkyl celluloses, guar gum, natural gums, alginic acid, polycarboxylic acids, cyclodextrins, and mixtures thereof;

at least about 80% of the dye absorber will remain associated with the matrix and at least about 70% of the dye transfer inhibitor will be released into the wash liquor; the combination of support matrix and dye absorber results in at least a 10% increase in a ΔE value compared to a ΔE value for the matrix alone; and further wherein the combination of support matrix, dye absorber and dye transfer inhibitor results in at most a 75% reduction in a ΔE value compared to a ΔE value for the matrix and dye absorber combination.

23. A method of inhibiting transfer of fugitive dyes in a wash liquor and of indicating said inhibition, the method comprising introducing to a wash liquor an article comprising a support matrix, a dye absorber and a dye transfer inhibitor, the article adapted for giving rise to a ΔE value for a combination of support matrix and dye absorber that is at least 10% greater than a ΔE value for the support matrix alone; and further adapted for giving rise to a ΔE value for a combination of support matrix, dye absorber and dye transfer inhibitor that is at most 75% less than a ΔE value for the matrix and dye absorber combination, wherein the dye absorber is fixably associated with the support matrix and adapted for imparting a detectable color change to the matrix, and the dye transfer inhibitor is releasably associated with the support matrix and adapted for preventing undesirable transfer of fugitive dyes.

24. The method of claim 23, wherein the support matrix is selected from the group consisting of those that have absorptive capacity, those that contain reactive groups, and mixtures thereof, further wherein the reactive groups comprise hydroxyl, acetyl and carboxyl moieties, derivatized species thereof and mixtures thereof;

the dye absorber is selected from the group consisting of quaternary ammonium-hydroxy-haloalkyl compounds, salts of epoxyalkyl ammonium compounds, polyquaternary ammonium compounds, polyamphoterics, quaternized starches, proteins, chitin, chitosan, choline chlorides, polyvinyl amine, polyethylene imine, and mixtures thereof; and the dye transfer inhibitor is selected from the group consisting of polyvinyl pyrrolidone, polyvinyl alcohol, polyvinyl imidazole, polyamine-N-oxides, cationic starches, magnesium aluminate, hydrotalcite, proteins, hydrolyzed proteins, polyethylene imines, polyvinyl oxazolidone, enzymes, oxidants, cationic surfactants, amphoteric surfactants, propylene oxide reaction products, polyamino acids, block co-polymers of alkylene oxides, polyamines, polyamides, methyl cellulose, carboxyalkyl celluloses, guar gum, natural gums, alginic acid, polycarboxylic acids, cyclodextrins, and mixtures thereof.

25. The method of claim 24, wherein the dye transfer inhibitor is polyvinyl pyrrolidone.

* * * * *